United States Patent [19]

Masiello

[11] 4,047,188

[45] Sept. 6, 1977

[54] STABILIZER FOR PHOTOCOMPOSITION MATRIX

[75] Inventor: Felix R. Masiello, Parsippany, N.J.

[73] Assignee: Addressograph Multigraph Corporation, Cleveland, Ohio

[21] Appl. No.: 700,409

[22] Filed: June 28, 1976

[51] Int. Cl.[2] .............................................. G03B 21/134

[52] U.S. Cl. ........................................ 354/15; 354/19; 360/130

[58] Field of Search ....................... 354/12, 13, 14, 15, 354/16, 19; 360/130

[56] References Cited

U.S. PATENT DOCUMENTS 3,440,936 4/1969 Tibbling et al. ........................ 354/15

FOREIGN PATENT DOCUMENTS 535,769 3/1955 Belgium ................................ 354/12

*Primary Examiner*—Edna M. O'Connor

[57] ABSTRACT

An edge guide for the rotating disc of a photocomposition machine wherein the guide is made up of a plurality of guide surfaces, offset with respect to one another on opposite sides of a plane, and staggered along a guide path so that preferably no guide surface is opposite another guide surface. The radial clearance between any two guide edges is sufficient to allow the discharge of foreign matter.

3 Claims, 3 Drawing Figures

STABILIZER FOR PHOTOCOMPOSITION MATRIX

BACKGROUND OF THE INVENTION

Rotating font discs are widely used for photocomposition machines. The font is a transparency in an opaque background, and the entire series of characters of a single font are in a single circular path of the rotating disc. There are usually several separate font faces on each disc. The disc is caused to rotate with one of the circular paths of font characters located at a position to permit light to project through the transparency characters into an optical system of the machine.

Fonts have been historically produced on rigid glass supports in order to prevent wavering which would throw the character transparency beyond the optical depth of focus of the optical system. A common plane must be established and maintained within the optical perimeters of any optical system in order to provide proper focus and projection of quality images. The problem of maintaining such optical perimeters is often compounded because of the use of highly flexible materials such as thin photographic film for economic as well as quality reproduction reasons.

There are many factors such as handling, material grain, temperature and humidity which affect the flatness of such photographic materials. Also, varying rotational speeds of such materials will result in the formation of excessive dynamic distortion if not properly restricted. Therefore, a guidance system is required. Within such a guidance system, minimum wear of materials and non-clogging characteristics are of utmost importance.

SUMMARY OF THE INVENTION

The advantage of this invention is the ability to control the planar stability of a rotating flexible matrix with respect to a photocomposition optical system without undue wear or maintenance requirement.

FIGURES OF THE DRAWING

DESCRIPTION OF THE PREFERRED EMBODIMENT

Figure 1:
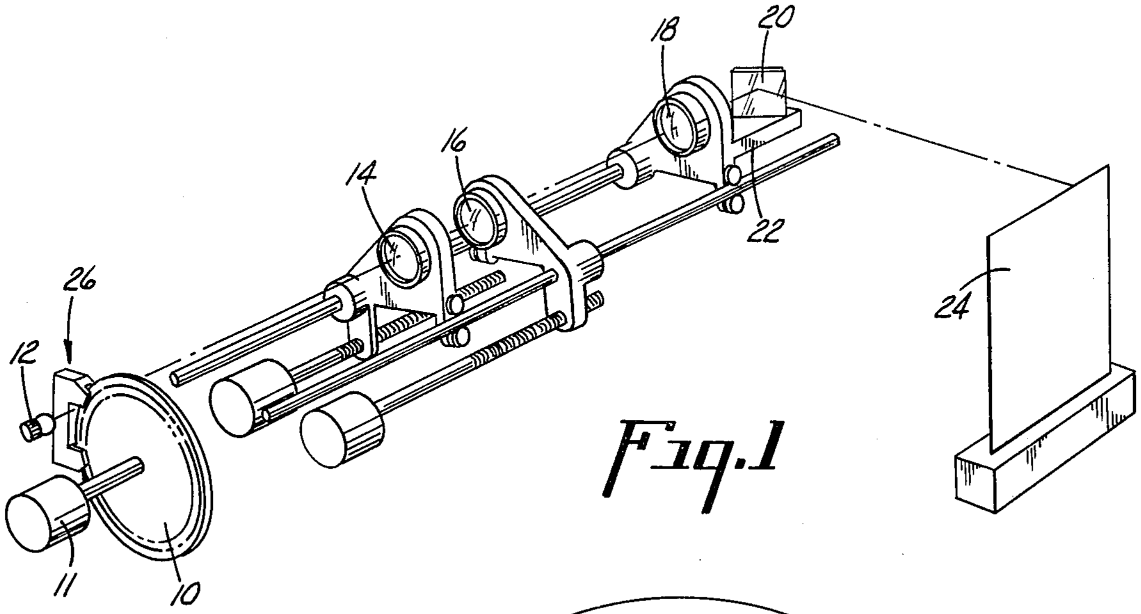
FIG. 1 is a schematic perspective view of a commercially available photocomposition font and optical system.

The FIG. 1 requires a minimum of description to those skilled in this art. A font disc 10 is rotated by a drive motor 11. A high intensity light source 12 is employed to flash whenever a selected character is brought into alignment with the optical system. The image is then carried through lenses such as a variator lens 14, collimating lens 16 and decollimating lens 18. Lens 18 and a mirror 20 are carried by a carriage 22 which is an escapement mechanism for spacing characters projected through the optical system upon sensitized sheet 24.

An edge guide 26 is supported by the machine and is positioned to confine the edge of the disc 10 in order to stabilize the disc as it rotates.

Figure 2:
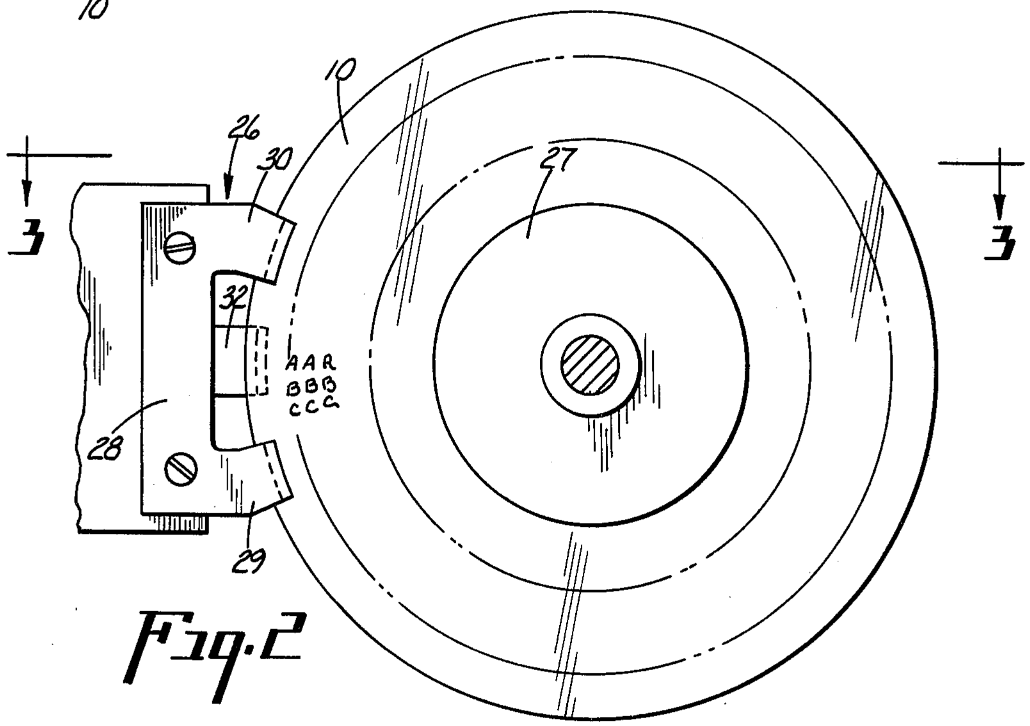
FIG. 2 is an elevation view of the disc and guide of FIG. 1 separated from the associated equipment.

Referring to FIG. 2, the disc 10 is illustrated as being supported by a hub assembly 27 which is as large as the series of font paths will permit in order to stabilize the disc to a maximum extent.

The edge guide 26 is illustrated as being composed of a first and second guide member. The first guide member 28 has spaced flat guide fingers 29 and 30.

The second guide 32 is a single finger positioned midway between the fingers 29 and 30 of the first guide.

Figure 3:
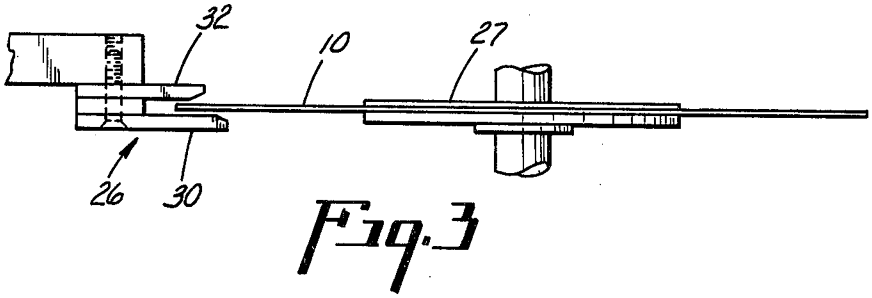
FIG. 3 is a top view taken along the line 3—3 of FIG. 2.

Hence, the FIG. 2 illustrates an edge guide with at least two guide surfaces, and in this case three, which are offset with respect to a plane. The members 29 and 30 are in a common plane and the guide surface 32 is offset with respect to the plane of the first two. The offset, as illustrated in FIG. 3, is substantially equal to the thickness of the matrix, which is the disc 10 in this instance.

The guides are spaced relative to one another out of direct facing relationship, and preferably, as shown in FIG. 2, they are fully separated along a guide path without opposing interface. That is, they do not register in any degree.

It is possible in some applications to eliminate one of the common plane guide members without adversely effecting the performance of the system. Rotational speeds, number of optical positions required, necessary clearances as well as system depth of focus will determine the necessity of additional restraints.

Finally, it should be noted that the space defined by the fingers 29, 30, and 32 is aligned with the proper position for the disc 10 established by the hub 27.

The spaced finger configuration of this invention provides clearance for the build-up of materials from environmental as well as materials transferred due to friction encountered. This invention has proven to eliminate much of the destructive tendencies of various prior guide systems employed.

What is claimed is:

1. In a photocomposition machine having a rotating flexible matrix, an optical system, and means for illuminating selected areas of the matrix as the area passes through a position to project into the optical system, the provision of an improved edge guide for the matrix, comprising:

- at least two guide surfaces offset with respect to a plane, said offset being substantially equal to the thickness of said matrix;
- said guides being spaced relative to one another out of direct facing relationship; and
- means for positioning said edge guide with the matrix edge confined within the space defined by said guide surfaces.

2. The guide of claim 1 wherein there are three guide surfaces, two of which are in a common plane and one offset.

3. The guide of claim 1 in which all guides are fully separated along a guide path without opposing interface.

* * * * *